C. G. SMITH.
SPRING VEHICLE WHEEL.
APPLICATION FILED SEPT. 27, 1911.
1,047,319.
Patented Dec. 17, 1912.
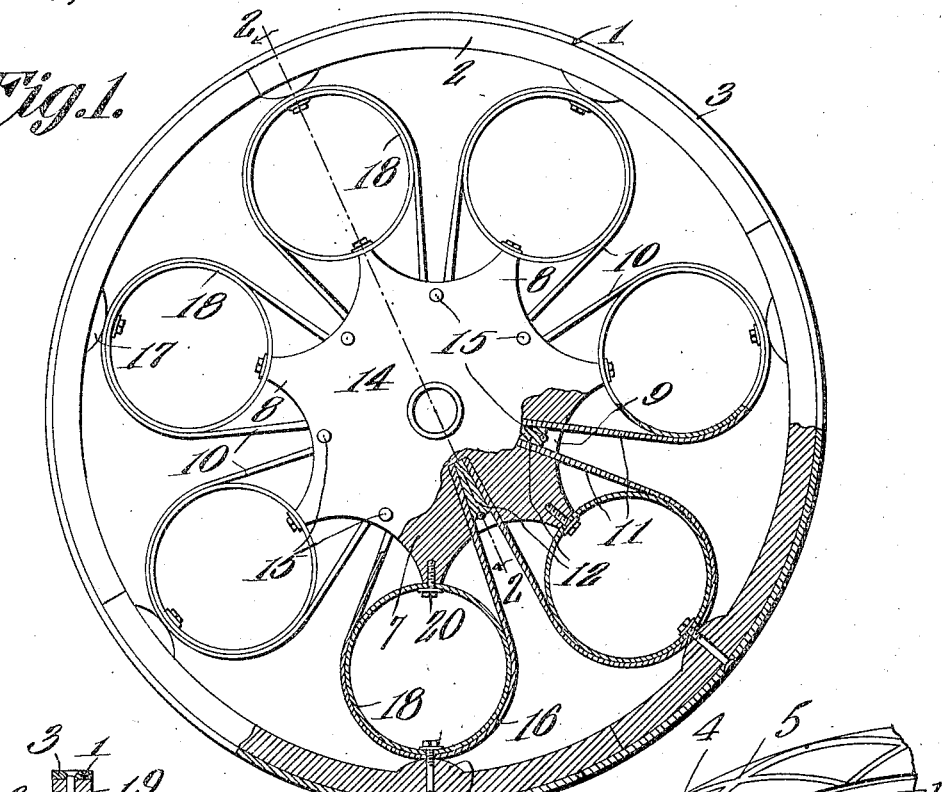
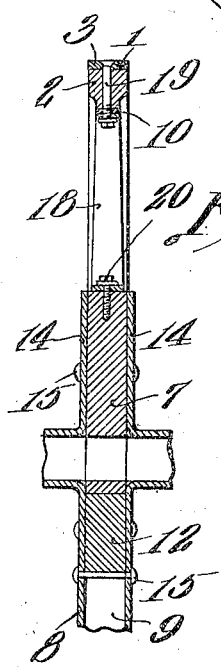
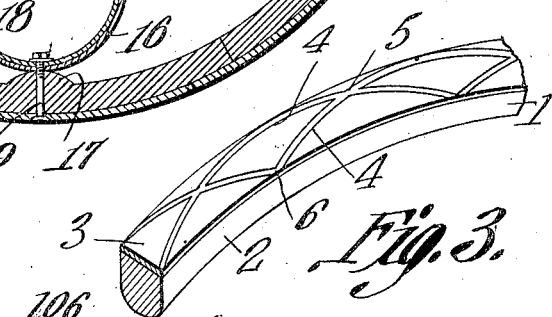
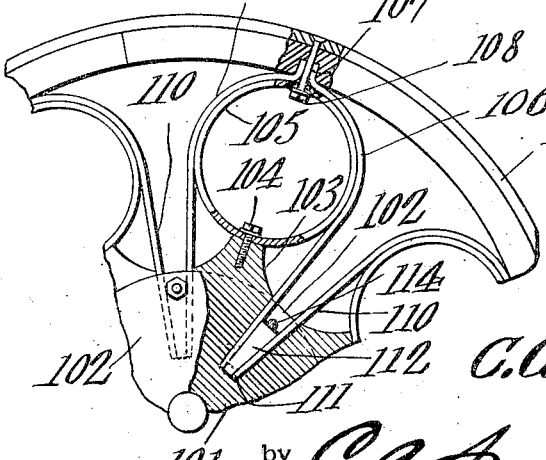
Witnesses
Frank B. Wooden
L. H. Wilson
C. G. Smith,
Inventor
by C. A. Snow & Co.
Attorneys

UNITED STATES PATENT OFFICE.

CICERO G. SMITH, OF PALISADES, COLORADO.

SPRING VEHICLE-WHEEL.

1,047,319.    Specification of Letters Patent.    Patented Dec. 17, 1912.

Application filed September 27, 1911. Serial No. 351,662.

*To all whom it may concern:*

Be it known that I, CICERO G. SMITH, a citizen of the United States, residing at Palisades, in the county of Mesa and State of Colorado, have invented a new and useful Spring Vehicle-Wheel, of which the following is a specification.

It is the object of the present invention to provide a spring wheel, the resiliency of which is afforded by a novel combination of spring elements, giving the wheel the desired amount of resiliency without rendering the wheel unstable.

A further object of the invention is to provide a hub and a rim, adapted to permit the spring spokes to have the necessary amount of movement, due to their resiliency.

A further object of the invention is to provide novel means for assembling the spring spokes with the hub of the vehicle wheel.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in side elevation, parts being broken away; Fig. 2 is a section on the line 2—2 of Fig. 1; and Fig. 3 is a fragmental perspective of the rim. Fig. 4 is a sectional side elevation of a fragment of a wheel constructed in accordance with my invention, the view depicting a modification.

The rim is denoted generally by the numeral 1, and may be of any desired form, depending upon whether the wheel is to be used for light or for heavy duty. The rim 1 preferably embraces a felly 2, ordinarily made in a number of sections, the felly 2 being surrounded by a tire 3, preferably of metal, there being in the tire 3 a series of grooves 4, intersecting adjacent the median plane of the wheel, as shown at 5, the ends of the grooves 4 preferably opening into each other at the sides of the wheel, as shown at 6. I bind myself to no specific form of tire, since a tire of any desired construction may be employed with the spring wheel structure to be described hereinafter.

The invention further includes a hub denoted generally by the numeral 7. The hub 7 is stelliform in outline, and terminates in a plurality of outstanding bosses 8. There are in the hub 7, between the bosses 8, radially extended openings 9.

The invention further includes a series of resilient arched structures denoted generally by the numeral 10. The ends 11 of each of these structures are disposed upon opposite sides of one of the bosses 8, the ends of adjacent structures 10 being inserted into one of the openings 9. Wedges 12 are inserted into the openings 9, between the ends 11 of adjacent structures 10, to bind the said structures in place within the hub 7. To the outer faces of the hub 7, side plates 14 are applied, securing elements 15 being extended through the plates 14. The securing elements 15 engage with the outer ends of the wedges 12, and constitute means for holding the wedges in place within the hub 7.

The outer, curved portions 16 of the spring structures 10 abut against lugs 17 preferably formed integrally with the felly 2. Located within the curved portions 16 of the arched structures 10, are endless spring members, preferably taking the form of rings 18, the rings 18 being engaged throughout the major portion of their circumferences by the curved portions 16 of the structures 10. Through the rings 18 and through the curved portions 16 of the structures 10, and through the lugs 17, bolts 19 or the like are extended. The rings 18 bear against the extremities of the lugs 8, and securing devices 20 are passed through the rings 18, to engage with the lugs 8. Owing to the presence of the lugs 17, the springs 10 and 18 may yield to a considerable extent without coming into engagement with the rim 1. Likewise, owing to the fact that the hub 7 is provided with the bosses 8, which bosses are spaced apart from the ends 11 of the structures 10, the spring rings 18 will yield readily, the construction being such that the ring 18 is supported upon a relatively small area, represented by the extremity of each boss 8.

As clearly seen in Fig. 2, the structures 10 are somewhat wider adjacent the hub 7 than adjacent the rim 1. Likewise, these structures are preferably somewhat thicker adjacent the hub, than adjacent the rim.

From the foregoing it will be seen that I have devised a vehicle wheel which will have great resiliency, and a wheel which will readily free itself from mud. Although the wheel will yield to the proper amount, in a fixed plane, a lateral yielding of the wheel is prevented owing to the presence of the spring rings 18.

In that form of the invention which appears in Fig. 4, the hub is denoted generally by the numeral 101, the numeral 102 indicating the side plates and the numeral 103 indicating the bosses of the hub. Securing elements 104 unite the spring rings 105 with the bosses 103. In that form of the invention which is under discussion, the resilient, arched structures hereinbefore referred to, are of two part construction, comprising like elements 106. These elements 106 are equipped at their outer ends with angularly disposed fingers 107 which enter the rim, denoted generally by the numeral 109. The securing elements 108 pass through the rings 105, and enter the rim 109 between the fingers 107. As before, the resilient, arched structures bear against the rim 109, and the spring rings 105 are engaged with the arched structures, in the curved portions of the arched structures. The ends 110 of the members 106 enter openings in the hub 101, as shown at 111. The wedges 112 are employed as before, securing elements 114 uniting the side plates 102, to hold the wedges in place.

That form of the invention which is shown in Fig. 4 differs from that form which is shown in Fig. 1, only in the fact that the resilient arched structures are of two-part construction, in Fig. 4, the angular fingers 107 being inserted into the rim 109. The fingers 107 are received against the securing element 108, so that the latter constitutes an abutment for the former. One of the advantages attributable to that form of the invention which is shown in Fig. 4 is that should either of the members 106 become broken, such members may be renewed, without renewing the complemental member.

Having thus described the invention, what is claimed is:—

1. A wheel comprising a hub provided with radial openings; a rim; spokes secured to the rim and having their ends disposed in the openings; side plates applied to the hub; wedges inserted into the openings, and located between the side plates; and connecting elements uniting the side plates and engaging the wedges.

2. A wheel comprising a hub and a rim; a resilient, arched, two-part structure, the parts of which at one end are inserted into the hub and at the other end inserted into the rim; a spring ring bearing against the curved portion of the arched structure and against the hub; and a securing element engaging the ring and engaging the rim between the rim-inserted ends of said parts.

3. A wheel comprising a hub and a rim; a resilient, arched, two-part structure, the parts of which at one end are inserted into the hub and at the other end inserted into the rim; a spring ring bearing against the curved portion of the arched structure and against the hub; and a securing element engaging the ring and engaging the rim between the rim-inserted ends of said parts; and wedges inserted into the hub between the hub-inserted ends of adjacent arched structures.

4. In a spring wheel, a spider in the form of a star with blunted points, a rim concentric with said spider, a resilient arch member bearing against the rim and having its ends secured in said spider on either side of one of said blunted points, a resilient ring within and bearing against the arch of said arched member, fastening means extending through said rim, arch and ring, and fastening means for securing said ring to its corresponding blunted point.

In testimony that I claim the foregoing as my own, I have hereto affixed my signature in the presence of two witnesses.

CICERO G. SMITH.

Witnesses:
H. R. HOUGH,
MABEL LAWRENCE.